United States Patent
Kuo et al.

(10) Patent No.: US 8,810,874 B2
(45) Date of Patent: Aug. 19, 2014

(54) DUPLEX SCANNING APPARATUS AND SHEET-FEEDING CONTROL METHOD THEREOF

(75) Inventors: Ping-Hung Kuo, Taipei (TW); Yi-Liang Chen, Taipei (TW); Wei-Hsun Hsu, Taipei (TW); Szu-Chieh Wu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 120 days.

(21) Appl. No.: 13/586,636

(22) Filed: Aug. 15, 2012

(65) Prior Publication Data

US 2013/0308169 A1    Nov. 21, 2013

(30) Foreign Application Priority Data

May 18, 2012  (TW) .............................. 101117759 A (51) Int. Cl.
*H04N 1/04* (2006.01)

(52) U.S. Cl.
USPC ........... 358/498; 358/474; 399/396; 399/394; 399/388; 399/367; 271/259; 271/258.01; 271/265.01; 271/265.02; 271/265.03; 271/266; 271/8.1

(58) Field of Classification Search
CPC ...................... H04N 1/00572; H04N 1/00612
USPC ................. 271/259, 258.01, 265.01, 265.02, 271/265.03, 266, 8.1
See application file for complete search history.

(56) References Cited

U.S. PATENT DOCUMENTS

| | | | | |
|---|---|---|---|---|
| 5,461,468 A | * | 10/1995 | Dempsey et al. | 399/396 |
| 6,651,980 B2 | * | 11/2003 | Isemura et al. | 271/259 |
| 7,611,145 B2 | * | 11/2009 | Iwago et al. | 271/291 |

* cited by examiner

*Primary Examiner* — Paul F Payer
(74) *Attorney, Agent, or Firm* — Kirton McConkie; Evan R. Witt (57) ABSTRACT

A duplex scanning apparatus and a sheet-feeding control method thereof are provided. The duplex scanning apparatus includes a sheet feeding channel, a sheet transfer channel, an inverting channel, and a sheet sensing module. A first end of the inverting channel is connected to a junction between said sheet feeding channel and the sheet transfer channel. A second end of the inverting channel is connected to the sheet transfer channel. A distance between the sheet sensing module and the first end of the inverting channel is greater than a distance between the sheet sensing module and the second end of the inverting channel. When a document is transferred through the sheet sensing module at the second time, a next document is fed into the sheet feeding channel through a sheet entrance.

16 Claims, 7 Drawing Sheets

DUPLEX SCANNING APPARATUS AND SHEET-FEEDING CONTROL METHOD THEREOF

FIELD OF THE INVENTION

The present invention relates to a duplex scanning apparatus, and more particularly to a duplex scanning apparatus for enhancing the efficiency of transmitting documents.

BACKGROUND OF THE INVENTION

Scanning apparatuses are widely used for scanning images of paper documents. Consequently, the contents of the paper documents can be converted into electronic files. The electronic files may be further spread, managed or stored by the user. With the maturity of scanning technologies, the scanning apparatuses have experienced great growth and are now rapidly gaining in popularity. In the early stage, the scanning apparatus can only scan one side of the document. For scanning both sides of the document, after one side of the document has been scanned, the document should be manually turned over so as to scan the other side of the document. However, the process of manually turning over the document is troublesome. For solving the drawbacks, a duplex scanning apparatus has been developed to scan both sides of the document.

Figure 1:
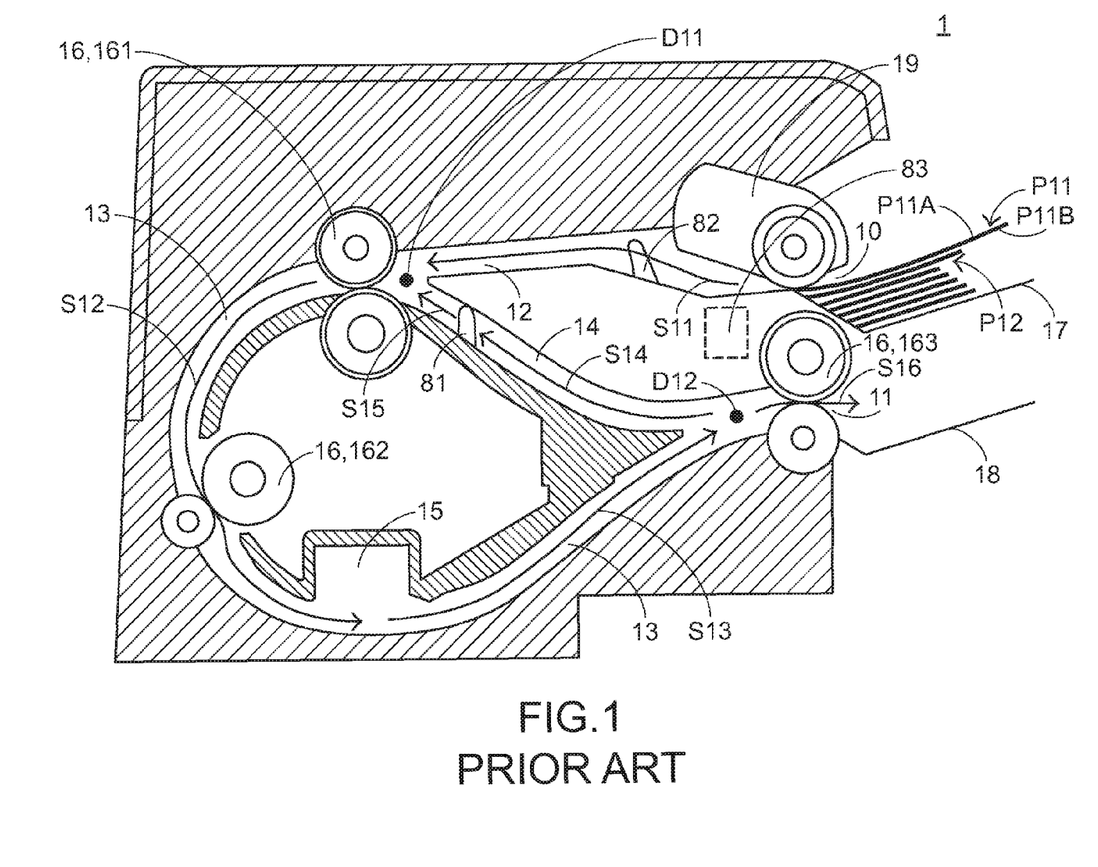
FIG. 1 is a schematic side view illustrating a conventional duplex scanning apparatus.

FIG. 1 is a schematic side view illustrating a conventional duplex scanning apparatus. As shown in FIG. 1, the conventional duplex scanning apparatus 1 comprises a sheet entrance 10, a sheet exit 11, a sheet feeding channel 12, a sheet transfer channel 13, an inverting channel 14, an image reading module 15, a transfer roller assembly 16, a sheet input tray 17, a sheet output tray 18, and a sheet pick-up module 19. The sheet feeding channel 12 is arranged between the sheet entrance 10 and the sheet transfer channel 13. The sheet transfer channel 13 is arranged between the sheet feeding channel 12 and the sheet exit 11. A first end D11 of the inverting channel 14 is connected to the junction between the sheet feeding channel 12 and the sheet transfer channel 13. A second end D12 of the inverting channel 14 is connected to the sheet transfer channel 13. The image reading module 15 is located in the sheet transfer channel 13 for reading the image of a document. The transfer roller assembly 16 comprises plural transfer rollers 161~163 for transferring the document that is located within the sheet feeding channel 12, the sheet transfer channel 13 and the inverting channel 14. Moreover, the sheet input tray 17 is located near the sheet entrance 10. The documents to be scanned are placed on the sheet input tray 17, and sequentially fed into the sheet feeding channel 12 by the sheet pick-up module 19. The sheet output tray 18 is located near the sheet exit 11 for supporting the document that is ejected from the sheet exit 11.

Moreover, the conventional duplex scanning apparatus 1 further comprises a first sheet sensing module 81, a second sheet sensing module 82, and a controller 83. The sheet pick-up module 19, the first sheet sensing module 81 and the second sheet sensing module 82 are all electrically connected to the controller 83. The first sheet sensing module 81 is located near the first end D11 of the inverting channel 14. That is, the distance between the first sheet sensing module 81 and the first end D11 of the inverting channel 14 is smaller than the distance between the first sheet sensing module 81 and the second end D12 of the inverting channel 14. Moreover, the first sheet sensing module 81 is used for sensing the transmitting status of the document in the inverting channel 14. When a front edge or a rear edge of the document is transferred through the first sheet sensing module 81, the first sheet sensing module 81 issues a first sensing signal to the controller 83. The second sheet sensing module 82 is located near the sheet entrance 10 for sensing the transmitting status of the document in the sheet feeding channel 12. When the front edge or the rear edge of the document is transferred through the second sheet sensing module 82, the second sheet sensing module 82 issues a second sensing signal to the controller 83.

The operations of the conventional duplex scanning apparatus 1 will be illustrated by referring to the sheet transfer paths S11~S16 of FIG. 1. Furthermore, the duplex scanning apparatus 1 may be operated in a single-sided scanning mode or a duplex scanning mode. Hereinafter, the operations of the conventional duplex scanning apparatus 1 in the single-sided scanning mode will be illustrated in more details. Firstly, a document P11 is fed into the sheet feeding channel 12 through the sheet entrance 10 by the sheet pick-up module 19. Then, the document P11 is transmitted from the sheet feeding channel 12 to the sheet transfer channel 13, so that the image of the first side P11A of the document P11 is read by the image reading module 15. After the reading operation is performed by the image reading module 15, the document P11 is transmitted to the sheet exit 11 and ejected to the sheet output tray 18. Meanwhile, the single-sided scanning operation on the document P11 is completed.

Furthermore, when the document P11 is introduced into the sheet feeding channel 12 and the front edge or the rear end of the document P11 is transferred through the second sheet sensing module 82, the second sheet sensing module 82 issues a second sensing signal to the controller 83. In response to the second sensing signal, the controller 83 will drive the sheet pick-up module 19 to feed a next document P12 into the sheet feeding channel 12. Subsequently, the next document P12 is transmitted and scanned by the similar process of transmitting and scanning the document P11, and thus the single-sided scanning operation on the next document P12 is completed.

The conventional duplex scanning apparatus 1 in the duplex scanning mode may be implemented by two operating approaches. Hereinafter, a first operating approach of the duplex scanning mode will be illustrated in more details. After the conventional duplex scanning apparatus 1 is operated in the duplex scanning mode and the duplex scanning apparatus 1 is activated, the document P11 is fed into the sheet feeding channel 12 through the sheet entrance 10. Then, the document P11 is transmitted from the sheet feeding channel 12 to the sheet transfer channel 13, so that the image of the first side P11A of the document P11 is read by the image reading module 15. After the reading operation is performed by the image reading module 15, the document P11 is transmitted to the second end D12 of the inverting channel 14. Then, the document P11 is introduced to the inverting channel 14. Then, the document P11 is introduced into the sheet transfer channel 13 again, and thus the image of the second side P11B of the document P11 is read by the image reading module 15.

Moreover, the plural scanned documents which are outputted from the sheet exit 11 and placed on the sheet output tray 18 should be in the same order as the original stack of documents on the sheet input tray 17. For achieving the purpose, after the image of the second side P11B of the document P11 is read by the image reading module 15, the document P11 is transmitted to the second end D12 of the inverting channel 14 again. Then, the document P11 is introduced to the inverting channel 14 again. After the document P11 is introduced into the sheet transfer channel 13 again, the document P11 is transmitted to the sheet exit 11 and ejected to the sheet output tray 18. Meanwhile, the duplex scanning operation on the document P11 is completed.

Furthermore, when the document P11 is transmitted to the sheet exit 11 and ejected to the sheet output tray 18, the controller 83 will drive the sheet pick-up module 19 to feed the next document P12 into the sheet feeding channel 12. Subsequently, the next document P12 is transmitted and scanned by the similar process of transmitting and scanning the document P11, and thus the duplex scanning operation on the next document P12 is completed.

A second operating approach of the duplex scanning mode will be illustrated as follows. When the document P11 is introduced to the inverting channel 14 and the front edge or the rear end of the document P11 is transferred through the first sheet sensing module 81 at the last time, the first sheet sensing module 81 issues a first sensing signal to the controller 83. In response to the first sensing signal, the controller 83 will drive the sheet pick-up module 19 to feed the next document P12 into the sheet feeding channel 12. Subsequently, the next document P12 is transmitted and scanned by the similar process of transmitting and scanning the document P11, and thus the duplex scanning operation on the next document P12 is completed.

In the modern society, it is necessary to further reduce the time period of performing the duplex scanning operation on the document by the duplex scanning apparatus in order to enhance the working efficiency.

SUMMARY OF THE INVENTION

The present invention provides a duplex scanning apparatus for enhancing the efficiency of transmitting documents.

The present invention relates to a sheet-feeding control method of a duplex scanning apparatus, and more particularly to a sheet-feeding control method for enhancing the efficiency of transmitting documents.

In accordance with an aspect of the present invention, there is provided a duplex scanning apparatus. The duplex scanning apparatus includes a sheet entrance, a sheet exit, a sheet feeding channel, a sheet pick-up module, a sheet transfer channel, an inverting channel, an image reading module, a transfer roller assembly, a sheet sensing module, and a controller. The sheet feeding channel is connected to the sheet entrance. The sheet pick-up module is disposed in the sheet entrance for feeding a document into the sheet feeding channel. The sheet transfer channel is arranged between the sheet feeding channel and the sheet exit. A first end of the inverting channel is connected to a junction between the sheet feeding channel and the sheet transfer channel. A second end of the inverting channel is connected to the sheet transfer channel. The image reading module is disposed in the sheet transfer channel for reading an image of a document. The transfer roller assembly is for transferring the document which is located within the sheet feeding channel, the sheet transfer channel or the inverting channel. The sheet sensing module is used for sensing a transmitting status of the document in the inverting channel, thereby issuing a sensing signal. The controller is electrically connected to the sheet pick-up module and the sheet sensing module. In response to the sensing signal, the controller drives the sheet pick-up module to feed a next document into the sheet feeding channel. Moreover, a distance between the sheet sensing module and the first end of the inverting channel is greater than a distance between the sheet sensing module and the second end of the inverting channel.

In an embodiment, the sheet sensing module includes a first sensing arm and an electronic sensor. The first sensing arm is at least partially exposed to the inverting channel. When the document is transferred through the inverting channel, the first sensing arm is pushed by the document. The electronic sensor is used for issuing the sensing signal according to a moving status of the first sensing arm.

In an embodiment, the electronic sensor is an optical sensor, wherein the optical sensor has an emitting part for emitting a light beam and a receiving part for receiving the light beam.

In an embodiment, the first sensing arm includes a first rotating part, a first contacting part fixed on the first rotating part, and a sheltering part fixed on the first rotating part. The first contacting part is at least partially exposed to the inverting channel. When the first contacting part is pushed by the document, the first sensing arm performs a first rotating action with the first rotating part serving as an axle center, so that the sheltering part is synchronously rotated.

In an embodiment, before the first sensing arm performs the first rotating action, the sheltering part is arranged between the emitting part and the receiving part, so that the light beam from the emitting part fails to be received by the receiving part.

In an embodiment, the sheet sensing module further includes a second sensing arm, which is at least partially exposed to the sheet feeding channel. When the document is transferred through the sheet feeding channel, the second sensing arm is pushed by the document, wherein the electronic sensor issues the sensing signal according to a moving status of the second sensing arm.

In an embodiment, the second sensing arm includes a second rotating part and a second contacting part fixed on the second rotating part. The second contacting part is at least partially exposed to the sheet feeding channel. The first sensing arm includes a first rotating part and a first contacting part fixed on the first rotating part. The first contacting part is at least partially exposed to the inverting channel. When the second contacting part is pushed by the document, the second sensing arm performs a second rotating action with the second rotating part serving as an axle center. When the first contacting part is pushed by the document, the first sensing arm performs a first rotating action with the first rotating part serving as an axle center.

In an embodiment, the second sensing arm further includes a sheltering part and a second linking part, and the sheltering part and the second linking part are fixed on the second rotating part, so that the sheltering part is synchronously rotated in response to the second rotating action of the second sensing arm. The first sensing arm further includes a first linking part, and the first linking part is fixed on the first rotating part, so that the first linking part is synchronously rotated in response to the first rotating action of the first sensing arm. In response to the first rotating action of the first sensing arm, the second linking part is pushed by the first linking part, so that the second sensing arm performs the second rotating action.

In an embodiment, before the second sensing arm performs the second rotating action, the sheltering part is arranged between the emitting part and the receiving part, so that the light beam from the emitting part fails to be received by the receiving part.

In an embodiment, the first sensing arm further includes a sheltering part and a first linking part, and the sheltering part and the first linking part are fixed on the first rotating part, so that the sheltering part is synchronously rotated in response to the first rotating action of the first sensing arm. The second sensing arm further includes a second linking part, and the second linking part is fixed on the second rotating part, so that the second linking part is synchronously rotated in response to the second rotating action of the first sensing arm. Moreover, in response to the second rotating action of the second sensing arm, the first linking part is pushed by the second linking part, so that the first sensing arm performs the first rotating action.

In an embodiment, before the first sensing arm performs the first rotating action, the sheltering part is arranged between the emitting part and the receiving part, so that the light beam from the emitting part fails to be received by the receiving part.

In an embodiment, the first rotating action and the second rotating action have opposite rotating directions.

In an embodiment, the duplex scanning apparatus is permitted to be operated in a single-sided scanning mode or a duplex image scanning mode. If the duplex scanning apparatus is operated in the single-sided scanning mode, the document is not transferred through the inverting channel.

In an embodiment, if the duplex scanning apparatus is operated in the single-sided scanning mode, when the document is transferred through the sheet feeding channel to trigger the second sensing arm, the next document is fed into the sheet feeding channel through the sheet entrance.

In an embodiment, if the duplex scanning apparatus is operated in the duplex image scanning mode, when the document is transferred through the inverting channel to trigger the first sensing arm, the next document is fed into the sheet feeding channel through the sheet entrance.

In an embodiment, the duplex scanning apparatus further includes a sheet input tray. The sheet input tray is located near the sheet pick-up module for placing the document thereon.

In an embodiment, the duplex scanning apparatus further includes a sheet output tray. The sheet output tray is located near the sheet exit, wherein the document ejected from the sheet exit is supported on the sheet output tray.

In an embodiment, the duplex scanning apparatus further includes an enabling sensor. The enabling sensor is arranged between the junction and the image reading module for detecting whether the document is transferred through a position of the enabling sensor. If the enabling sensor detects that the document is transferred through the position of the enabling sensor, the image reading module is enabled.

In an embodiment, the transfer roller assembly at least includes one transfer roller, and the sheet pick-up module at least includes one sheet pick-up roller. Moreover, a rotating speed of the transfer roller is faster than that of the sheet pick-up roller.

In accordance with another aspect of the present invention, there is provided a sheet-feeding control method of a duplex scanning apparatus for scanning a first side image and a second side image of each document of plural documents. The duplex scanning apparatus includes a sheet entrance, a sheet exit, a sheet feeding channel, a sheet transfer channel and an inverting channel. The sheet feeding channel is connected to the sheet entrance. The sheet transfer channel is arranged between the sheet feeding channel and the sheet exit. A first end of the inverting channel is connected to a junction between the sheet feeding channel and the sheet transfer channel. A second end of the inverting channel is connected to the sheet transfer channel. The sheet-feeding control method includes the following steps. Firstly, the document is fed into the sheet feeding channel through the sheet entrance, and continuously introduced into the sheet transfer channel. Then, the first side image of the document is read. The document is transmitted to the second end of the inverting channel, and continuously introduced into the inverting channel. Then, the document is transmitted to the first end of the inverting channel, and continuously introduced into the sheet transfer channel. Then, the second side image of the document is read. Then, the document is transmitted to the second end of the inverting channel, and continuously introduced into the inverting channel. Then, the document is transmitted to the first end of the inverting channel and continuously introduced into the sheet transfer channel. When a first edge or a second edge of the document is transmitted to a position separated from the second end of the inverting channel by a specified spacing interval, a next document is fed into the sheet feeding channel through the sheet entrance. The specified spacing interval is smaller than one half of a distance between the first end and the second end of the inverting channel. Afterwards, the document is transmitted to the sheet exit and the next document is introduced into the sheet transfer channel, so that the document is outputted and the first side image of the next document is read.

In an embodiment, the sheet-feeding control method further includes a step of increasing a transmitting speed of each document in the inverting channel, so that the transmitting speed of each document in the inverting channel is faster than that of each document in the sheet feeding channel.

In an embodiment, the sheet-feeding control method further includes steps of providing a sheet pick-up module, providing an image reading module, providing a transfer roller assembly, providing a sheet sensing module, and providing a controller. The sheet pick-up module is disposed in the sheet entrance for sequentially feeding the plural documents into the sheet feeding channel. The image reading module is disposed in the sheet transfer channel for reading the first side image and the second side image of each document. The transfer roller assembly is used for transferring the document which is located within the sheet feeding channel, the sheet transfer channel or the inverting channel. The sheet sensing module is used for sensing a transmitting status of the document in the inverting channel, thereby issuing a sensing signal. A distance between the sheet sensing module and the first end of the inverting channel is greater than a distance between the sheet sensing module and the second end of the inverting channel. The controller is electrically connected to the sheet pick-up module and the sheet sensing module. In response to the sensing signal, the controller drives the sheet pick-up module to feed the next document into the sheet feeding channel.

In an embodiment, the sheet sensing module includes a first sensing arm and an electronic sensor. The first sensing arm is at least partially exposed to the inverting channel. When the document is transferred through the inverting channel, the first sensing arm is pushed by the document. The electronic sensor is used for issuing the sensing signal according to a moving status of the first sensing arm.

In an embodiment, the electronic sensor is an optical sensor, wherein the optical sensor has an emitting part for emitting a light beam and a receiving part for receiving the light beam.

In an embodiment, the first sensing arm includes a first rotating part, a first contacting part fixed on the first rotating part, and a sheltering part fixed on the first rotating part. The first contacting part is at least partially exposed to the inverting channel. When the first contacting part is pushed by the document, the first sensing arm performs a first rotating action with the first rotating part serving as an axle center, so that the sheltering part is synchronously rotated.

In an embodiment, before the first sensing arm performs the first rotating action, the sheltering part is arranged between the emitting part and the receiving part, so that the light beam from the emitting part fails to be received by the receiving part.

In an embodiment, the sheet-feeding control method further includes a step of providing a sheet input tray. The sheet input tray is located near the sheet pick-up module for placing the document thereon.

In an embodiment, the sheet-feeding control method further includes a step of providing a sheet output tray. The sheet output tray is located near the sheet exit. Moreover, the plural documents ejected from the sheet exit are supported on the sheet output tray.

In an embodiment, the sheet-feeding control method further includes a step of providing an enabling sensor. The enabling sensor is arranged between the junction and the image reading module for detecting whether the document is transferred through a position of the enabling sensor. If the enabling sensor detects that the document is transferred through the position of the enabling sensor, the image reading module is enabled.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2:
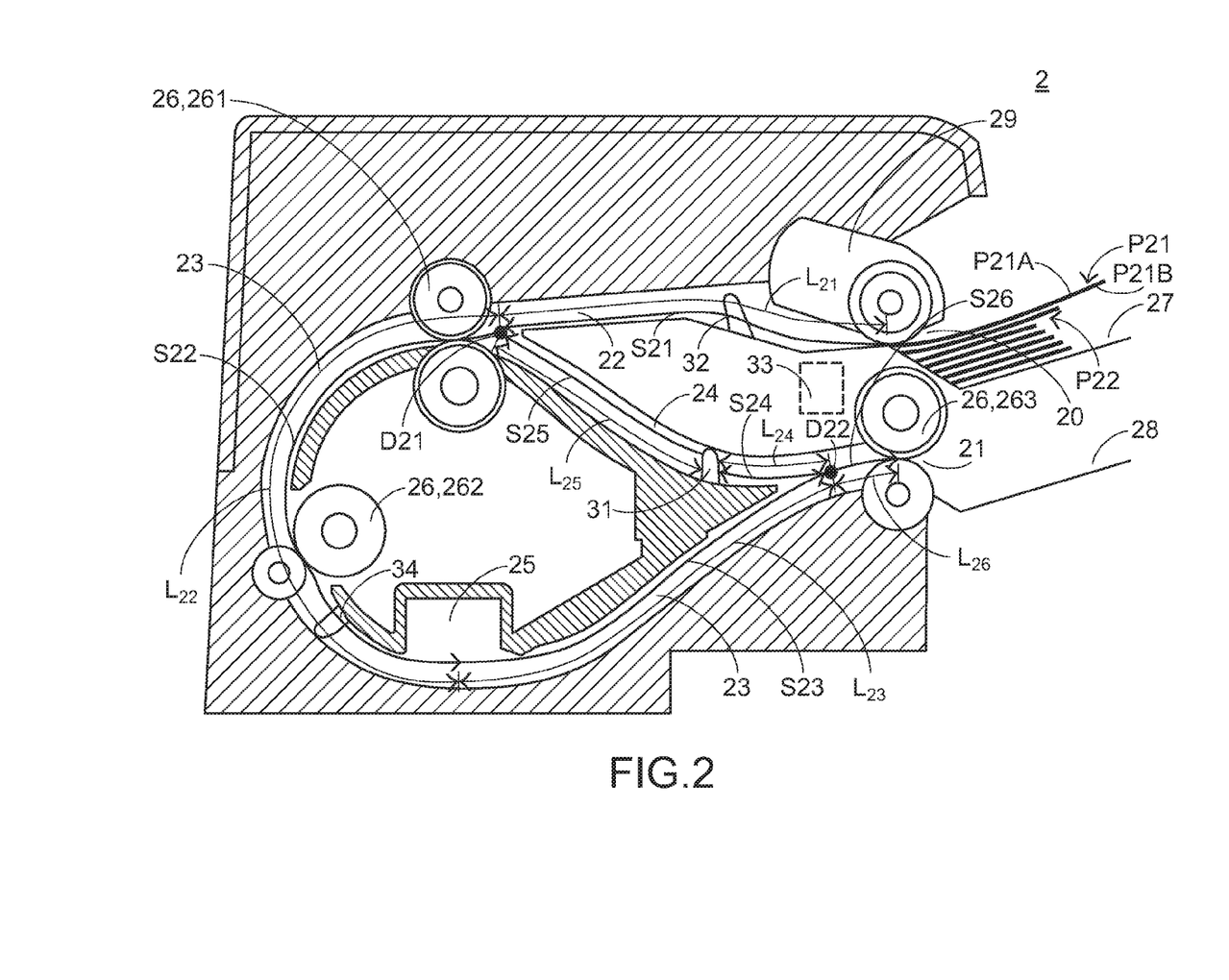
FIG. 2 is a schematic side view illustrating a duplex scanning apparatus according to an embodiment of the present invention.

FIG. 2 is a schematic side view illustrating a duplex scanning apparatus according to an embodiment of the present invention. As shown in FIG. 2, the duplex scanning apparatus 2 comprises a sheet entrance 20, a sheet exit 21, a sheet feeding channel 22, a sheet transfer channel 23, an inverting channel 24, an image reading module 25, a transfer roller assembly 26, a sheet input tray 27, a sheet output tray 28, and a sheet pick-up module 29. The sheet feeding channel 22 is arranged between the sheet entrance 20 and the sheet transfer channel 23. The sheet transfer channel 23 is arranged between the sheet feeding channel 22 and the sheet exit 21. A first end D21 of the inverting channel 24 is connected to the junction between the sheet feeding channel 22 and the sheet transfer channel 23. A second end D22 of the inverting channel 24 is connected to the sheet transfer channel 23. The image reading module 25 is located in the sheet transfer channel 23 for reading the image of a document. The transfer roller assembly 26 comprises plural transfer rollers 261~263 for transferring the document that is located within the sheet feeding channel 22, the sheet transfer channel 23 and the inverting channel 24. Moreover, the sheet input tray 27 is located near the sheet entrance 20. The plural documents to be scanned (e.g. P21, P22) are placed on the sheet input tray 27, and may be sequentially fed into the sheet feeding channel 22 by the sheet pick-up module 29. The sheet output tray 28 is located near the sheet exit 21 for supporting the document that is ejected from the sheet exit 21. It is noted that the sheet input tray 27 and the sheet output tray 28 are not essential components of the duplex scanning apparatus 2 of the present invention.

Moreover, the duplex scanning apparatus 2 further comprises a first sheet sensing module 31, a second sheet sensing module 32, and a controller 33. The sheet pick-up module 29, the first sheet sensing module 31 and the second sheet sensing module 32 are all electrically connected to the controller 33. The first sheet sensing module 31 is located near the second end D22 of the inverting channel 24. That is, the distance between the first sheet sensing module 31 and the second end D22 of the inverting channel 24 is smaller than the distance between the first sheet sensing module 31 and the first end D21 of the inverting channel 24. Moreover, the first sheet sensing module 31 is used for sensing the transmitting status of the document in the inverting channel 24. When a front edge or a rear edge of the document is transferred through the first sheet sensing module 31, the first sheet sensing module 31 issues a first sensing signal to the controller 33. The second sheet sensing module 32 is located near the sheet entrance 20 for sensing the transmitting status of the document in the sheet feeding channel 22. When the front edge or the rear edge of the document is transferred through the second sheet sensing module 32, the second sheet sensing module 32 issues a second sensing signal to the controller 33.

A sheet-feeding control method of the duplex scanning apparatus of the present invention will be illustrated in more details as follows. The operations of the duplex scanning apparatus 2 will be illustrated by referring to the sheet transfer paths S21, S22, S23, S24, S25 and S26 of FIG. 2. Furthermore, the duplex scanning apparatus 2 may be operated in a single-sided scanning mode or a duplex scanning mode. Hereinafter, the operations of the duplex scanning apparatus 2 in the single-sided scanning mode will be illustrated in more details. Firstly, a document P21 is fed into the sheet feeding channel 22 through the sheet entrance 20 by the sheet pick-up module 29. Then, the document P21 is transmitted from the sheet feeding channel 22 to the sheet transfer channel 23, so that the image of the first side P21A of the document P21 is read by the image reading module 25. After the reading operation is performed by the image reading module 25, the document P21 is transmitted to the sheet exit 21 and ejected to the sheet output tray 28. Meanwhile, the single-sided scanning operation on the document P21 is completed.

Furthermore, when the document P21 is transmitted into the sheet feeding channel 22 and the front edge or the rear end of the document P21 is transferred through the second sheet sensing module 32, the second sheet sensing module 32 issues a second sensing signal to the controller 33. In response to the second sensing signal, the controller 33 will drive the sheet pick-up module 29 to feed a next document P22 into the sheet feeding channel 22. Subsequently, the next document P22 is transmitted and scanned by the similar process of transmitting and scanning the document P21, and thus the single-sided scanning operation on the next document P22 is completed.

Figure 3:
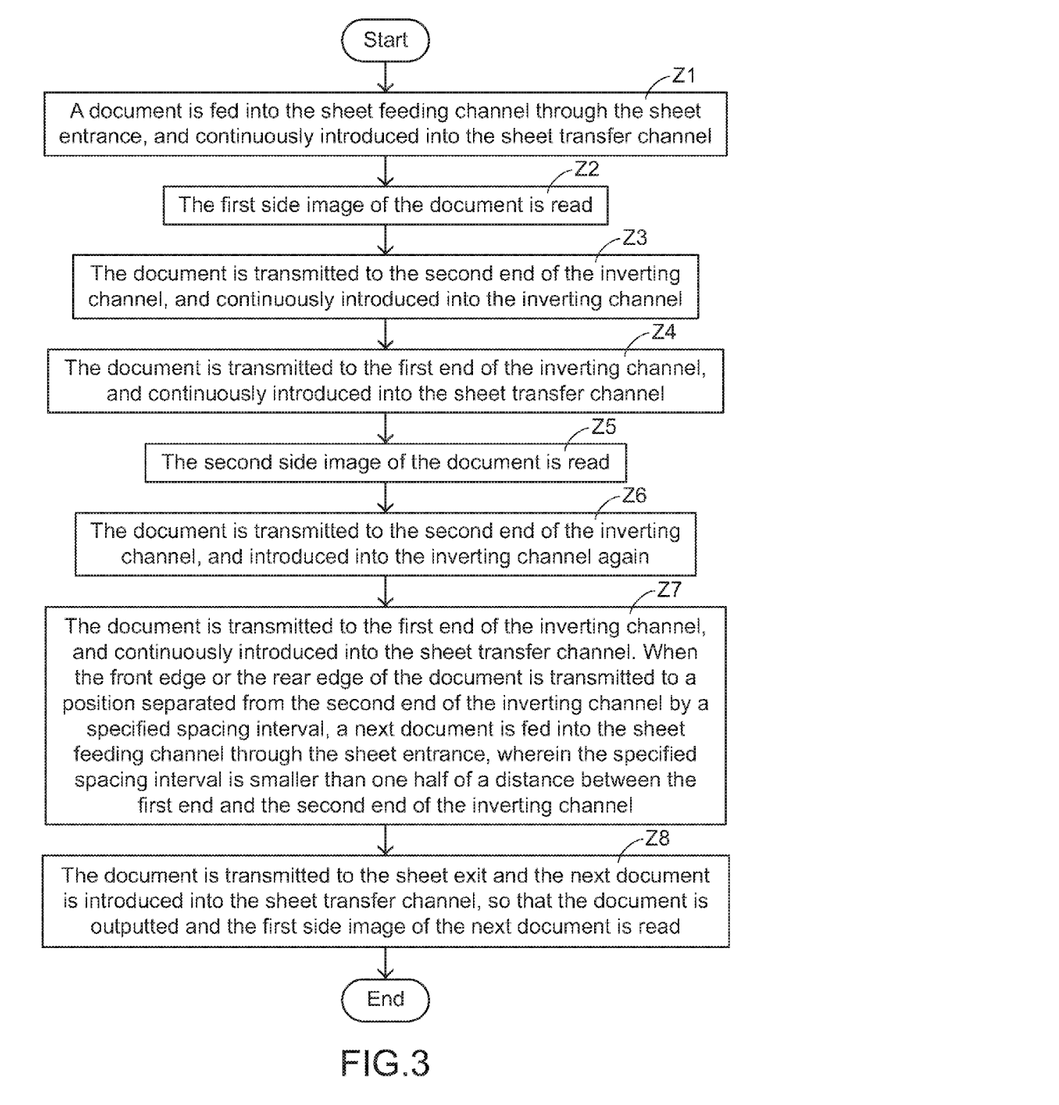
FIG. 3 is a flowchart illustrating a sheet-feeding control method of the duplex scanning apparatus in a duplex scanning mode according to an embodiment of the present invention.

Hereinafter, the operations of the duplex scanning apparatus 2 in the duplex scanning mode will be illustrated with reference to FIG. 3. FIG. 3 is a flowchart illustrating a sheet-feeding control method of the duplex scanning apparatus in a duplex scanning mode according to an embodiment of the present invention.

The sheet-feeding control method comprises the following steps. Firstly, a document is fed into the sheet feeding channel through the sheet entrance, and continuously introduced into the sheet transfer channel (Step Z1). Then, the first side image of the document is read (Step Z2). Then, the document is transmitted to the second end of the inverting channel, and continuously introduced into the inverting channel (Step Z3). Then, the document is transmitted to the first end of the inverting channel, and continuously introduced into the sheet transfer channel (Step Z4). Then, the second side image of the document is read (Step Z5). Then, the document is transmitted to the second end of the inverting channel, and introduced into the inverting channel again (Step Z6). Then, the document is transmitted to the first end of the inverting channel, and continuously introduced into the sheet transfer channel. When the front edge or the rear end of the document is transmitted to a position separated from the second end of the inverting channel by a specified spacing interval, a next document is fed into the sheet feeding channel through the sheet entrance, wherein the specified spacing interval is smaller than one half of a distance between the first end and the second end of the inverting channel (Step Z7). Then, the document is transmitted to the sheet exit and the next document is introduced into the sheet transfer channel, so that the document is outputted and the first side image of the next document is read (Step Z8).

In particular, please refer to FIGS. 2 and 3 again. If the duplex scanning apparatus 2 is operated in the duplex scanning mode, after the duplex scanning apparatus 2 is activated, the document P21 is fed into the sheet feeding channel 22 through the sheet entrance 20. Then, the document P21 is transmitted from the sheet feeding channel 22 to the sheet transfer channel 23, so that the image of the first side P21A of the document P21 is read by the image reading module 25. After the reading operation is performed by the image reading module 25, the document P21 is transmitted to the second end D22 of the inverting channel 24. Then, the document P21 is transmitted to the inverting channel 24, and introduced into the sheet transfer channel 23 again from the first end D21 of the inverting channel 24. Consequently, the image of the second side P21B of the document P21 is read by the image reading module 25.

Moreover, the plural scanned documents which are outputted from the sheet exit 21 and placed on the sheet output tray 28 should be in the same order as the original stack of documents on the sheet input tray 27. For achieving the purpose, after the image of the second side P21B of the document P21 is read by the image reading module 25, the document P21 is transmitted to the second end D22 of the inverting channel 24 again. Then, the document P21 is introduced into the inverting channel 24 again, and introduced into the sheet transfer channel 23 again from the first end D21 of the inverting channel 24. The document P21 is continuously transmitted to the sheet exit 21 and ejected to the sheet output tray 28. Meanwhile, the duplex scanning operation on the document P21 is completed.

Furthermore, when the document P21 is transmitted to the inverting channel 24 and the front edge or the rear end of the document P21 is transferred through the first sheet sensing module 31 at the second time, the first sheet sensing module 31 issues a first sensing signal to the controller 33. In response to the first sensing signal, the controller 33 will drive the sheet pick-up module 29 to feed the next document P22 into the sheet feeding channel 22. Subsequently, the next document P22 is transmitted and scanned by the similar process of transmitting and scanning the document P21, and thus the duplex scanning operation on the next document P22 is completed.

Figure 4:
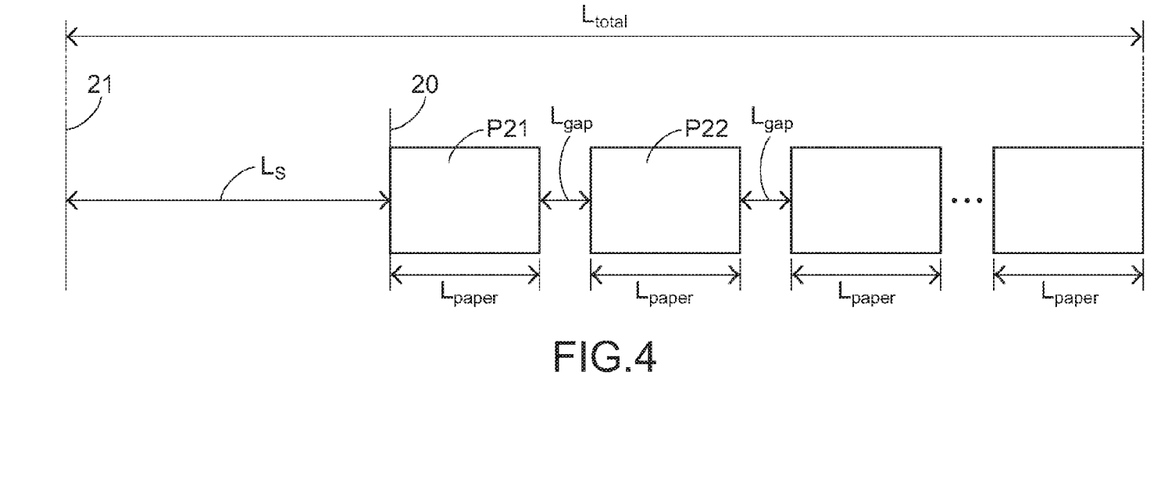
FIG. 4 is an equivalent schematic diagram illustrating the total transmission distance per unit time for a duplex scanning apparatus.

Hereinafter, the scanning efficiency of the present duplex scanning apparatus will be compared with the scanning efficiency of the conventional duplex scanning apparatus. First of all, a method of calculating a total transmission distance per unit time will be described. Please refer to FIG. 4, which is an equivalent schematic diagram illustrating the total transmission distance per unit time for a duplex scanning apparatus. As shown in FIG. 4, the duplex scanning apparatus is capable of scanning N documents per unit time. From the time spot when a specified document is fed into the duplex scanning apparatus through the sheet entrance until the specified document is outputted from the duplex scanning apparatus through the sheet exit, the travelling distance of the specified document is denoted as $L_S$. Moreover, a transmission spacing interval between the specified document and the next document is denoted as $L_{gap}$. Moreover, the length of each document is denoted as $L_{paper}$. Consequently, the total transmission distance per unit time for the duplex scanning apparatus may be calculated by the following formula (1):

$$L_{total} = N \times L_{paper} + (N-1) \times L_{gap} + L_S \quad (1)$$

Next, various device parameters of the duplex scanning apparatus of the present invention will be illustrated with reference to FIG. 4 as well as FIG. 2. In a case that the duplex scanning apparatus 2 is operated in the single-sided scanning mode, the duplex scanning apparatus 2 is capable of scanning N1 images per unit time T. In other words, the duplex scanning apparatus 2 is capable of scanning N1 documents per unit time T. Whereas, in a case that the duplex scanning apparatus 2 is operated in the duplex scanning mode, the duplex scanning apparatus 2 is capable of scanning N2 images per unit time T. In other words, the duplex scanning apparatus 2 is capable of scanning N2 documents per unit time T. Moreover, the lengths of the sheet transfer paths S21, S22, S23, S24, S25 and S26 are respectively $L_{21}$, $L_{22}$, $L_{23}$, $L_{24}$, $L_{25}$ and $L_{26}$, and the distance between the second sheet sensing module 32 and the sheet entrance 20 is denoted as $L_{32}$. According to the formula (1), the following formulae may be deduced:

$$L_{total} = N1 \times L_{paper} + (N1 - 1) \times L_{32} + (L_{21} + L_{22} + L_{23} + L_{26}),$$

$$L_{total} = N2 \times L_{paper} + (N2 - 1) \times \begin{pmatrix} L_{21} + L_{22} + L_{23} + L_{24} + L_{25} + L_{22} + \\ L_{23} + L_{paper} + L_{paper} + L_{24} \end{pmatrix} +$$

$$\begin{pmatrix} L_{21} + L_{22} + L_{23} + L_{24} + L_{25} + L_{22} + L_{23} + L_{paper} + \\ L_{paper} + L_{24} + L_{25} + L_{22} + L_{23} + L_{26} \end{pmatrix}$$

$$= N2 \times \begin{pmatrix} 3 \times L_{paper} + L_{21} + L_{22} + L_{23} + L_{24} + L_{25}L_{22} + \\ L_{23} + L_{24} \end{pmatrix} +$$

$$(L_{25} + L_{22} + L_{23} + L_{26}),$$

Consequently, $$N_2 = \frac{\begin{bmatrix} N1 \times L_{paper} + (N1 - 1) \times L_{32} + \\ (L_{21} + L_{22} + L_{23} + L_{26}) \end{bmatrix} - (L_{25} + L_{22} + L_{23} + L_{26})}{\begin{pmatrix} 3 \times L_{paper} + L_{21} + L_{22} + L_{23} + L_{24} + \\ L_{25} + L_{22} + L_{23} + L_{24} \end{pmatrix}} \quad (2)$$

According to the well-known definition, the duplex scanning efficiency η of the duplex scanning apparatus may be calculated by the following formula (3):

η=(the number of images capable of being scanned per unit time T by the duplex scanning apparatus in the duplex scanning mode)/(the number of images capable of being scanned per unit time T by the duplex scanning apparatus in the single-sided scanning mode)×100%  (3)

According to the formula (2) and the formula (3), the duplex scanning efficiency $\eta_1$ of the duplex scanning apparatus 2 of the present invention may be deduced as the following formula (4):

$$\eta_1 = \frac{\dfrac{\begin{bmatrix} N1 \times L_{paper} + (N1 - 1) \times L_{32} + \\ (L_{21} + L_{22} + L_{23} + L_{26}) \end{bmatrix} - (L_{25} + L_{22} + L_{23} + L_{26})}{\begin{pmatrix} 3 \times L_{paper} + L_{21} + L_{22} + L_{23} + L_{24} + \\ L_{25} + L_{22} + L_{23} + L_{24} \end{pmatrix}} \times 2}{N1} \times 100\% \quad (4)$$

Moreover, the duplex scanning efficiency of the conventional duplex scanning apparatus 1 may be calculated by the following method. Please refer to FIG. 1 again. The conventional duplex scanning apparatus 1 has various device parameters, including the respective lengths $L_{21}$, $L_{22}$, $L_{23}$, $L_{14}$, $L_{15}$ and $L_{26}$ of the sheet transfer paths S11-S16 and the distance $L_{32}$ between the second sheet sensing module 82 and the sheet entrance 10. In a case that the conventional duplex scanning apparatus 1 is operated in the single-sided scanning mode, the conventional duplex scanning apparatus 1 is capable of scanning N1 images per unit time T. In other words, the conventional duplex scanning apparatus 1 is capable of scanning N1 documents per unit time T. Whereas, in a case that the conventional duplex scanning apparatus 1 is operated in the first operating approach of the duplex scanning mode, the conventional duplex scanning apparatus 1 is capable of scanning N3×2 images per unit time T. In other words, the conventional duplex scanning apparatus 1 is capable of scanning N3 documents per unit time T. Whereas, in a case that the conventional duplex scanning apparatus 1 is operated in the second operating approach of the duplex scanning mode, the conventional duplex scanning apparatus 1 is capable of scanning N4×2 images per unit time T. In other words, the conventional duplex scanning apparatus 1 is capable of scanning N4 documents per unit time T. According to the formula (1), the following formulae may be deduced:

$$L_{total} = N1 \times L_{paper} + (N1 - 1) \times L_{32} + (L_{21} + L_{22} + L_{23} + L_{26}),$$

$$L_{total} = N3 \times L_{paper} + (N3 - 1) \times \begin{pmatrix} L_{21} + L_{22} + L_{23} + L_{14} + L_{15} + L_{22} + \\ L_{23} + L_{paper} + L_{paper} + L_{14} + L_{15} + \\ L_{22} + L_{23} + L_{26} \end{pmatrix} +$$

$$\begin{pmatrix} L_{21} + L_{22} + L_{23} + L_{14} + L_{15} + L_{22} + L_{23} + L_{paper} + L_{paper} + \\ L_{14} + L_{15} + L_{22} + L_{23} + L_{26} \end{pmatrix}$$

$$= N3 \times \begin{pmatrix} 3 \times L_{paper} + L_{21} + L_{22} + L_{23} + L_{14} + L_{15} + L_{22} + \\ L_{23} + L_{14} + L_{15} + L_{22} + L_{23} + L_{26} \end{pmatrix},$$

$$L_{total} = N4 \times L_{paper} + (N2 - 1) \times \begin{pmatrix} L_{21} + L_{22} + L_{23} + L_{14} + L_{15} + \\ L_{22} + L_{23} + L_{paper} + L_{paper} + L_{14} \end{pmatrix} +$$

$$\begin{pmatrix} L_{21} + L_{22} + L_{23} + L_{14} + L_{15} + L_{22} + L_{23} + L_{paper} + \\ L_{paper} + L_{14} + L_{15} + L_{22} + L_{23} + L_{26} \end{pmatrix}$$

$$= N4 \times \begin{pmatrix} 3 \times L_{paper} + L_{21} + L_{22} + L_{23} + L_{14} + L_{15} + L_{22} + \\ L_{23} + L_{14} \end{pmatrix} +$$

$$(L_{15} + L_{22} + L_{23} + L_{26}),$$

Consequently, $$N_3 = \frac{\begin{bmatrix} N1 \times L_{paper} + (N1 - 1) \times L_{32} + \\ (L_{21} + L_{22} + L_{23} + L_{26}) \end{bmatrix} - }{\begin{pmatrix} 3 \times L_{paper} + L_{21} + L_{22} + L_{23} + L_{14} + \\ L_{15} + L_{22} + L_{23} + L_{14} + L_{15} + \\ L_{22} + L_{23} + L_{26} \end{pmatrix}} \quad (5)$$

$$N_4 = \frac{\begin{bmatrix} N1 \times L_{paper} + (N1 - 1) \times L_{32} + \\ (L_{21} + L_{22} + L_{23} + L_{26}) \end{bmatrix} - (L_{15} + L_{22} + L_{23} + L_{26})}{\begin{pmatrix} 3 \times L_{paper} + L_{21} + L_{22} + L_{23} + L_{14} + \\ L_{15} + L_{22} + L_{23} + L_{14} \end{pmatrix}} \quad (6)$$

According to the formula (3) and the formula (5), the duplex scanning efficiency $\eta_2$ of the conventional duplex scanning apparatus 1 in the first operating approach may be deduced as the following formula:

$$\eta_2 = \frac{\dfrac{\begin{bmatrix} N1 \times L_{paper} + (N1 - 1) \times L_{32} + \\ (L_{21} + L_{22} + L_{23} + L_{26}) \end{bmatrix} - }{\begin{pmatrix} 3 \times L_{paper} + L_{21} + L_{22} + L_{23} + L_{14} + \\ L_{15} + L_{22} + L_{23} + L_{14} + L_{15} + \\ L_{22} + L_{23} + L_{26} \end{pmatrix}} \times 2}{N1} \times 100\%$$

According to the formula (3) and the formula (6), the duplex scanning efficiency $\eta_3$ of the conventional duplex scanning apparatus 1 in the second operating approach may be deduced as the following formula:

$$\eta_3 = \frac{\begin{bmatrix} N1 \times L_{paper} + (N1-1) \times L_{32} + \\ (L_{21} + L_{22} + L_{23} + L_{26}) \end{bmatrix} - \frac{(L_{15} + L_{22} + L_{23} + L_{26})}{\left( \begin{array}{c} 3 \times L_{paper} + L_{21} + L_{22} + L_{23} + L_{14} + \\ L_{15} + L_{22} + L_{23} + L_{14} \end{array} \right)} \times 2}{N1} \times 100\%$$

Please refer to FIGS. 2 and 4 again. The first sheet sensing module 31 of the present duplex scanning apparatus 2 is located near the second end D22 of the inverting channel 24, but the first sheet sensing module 81 of the conventional duplex scanning apparatus 1 is located near the first end D11 of the inverting channel 14. In other words, the position of the first sheet sensing module 31 of the present duplex scanning apparatus 2 and the position of the first sheet sensing module 81 of the conventional duplex scanning apparatus 1 are separated from each other by a spacing interval X. Consequently, the duplex scanning efficiency $\eta_2$ and the duplex scanning efficiency $\eta_3$ may be respectively rewritten by the following formulae (7) and (8):

$$\eta_2 = \frac{\begin{bmatrix} N1 \times L_{paper} + (N1-1) \times L_{32} + \\ (L_{21} + L_{22} + L_{23} + L_{26}) \end{bmatrix}}{3 \times L_{paper} + L_{21} + L_{22} + L_{23} + (L_{24} + X) +} \times 2 \\ \frac{(L_{25} - X) + L_{22} + L_{23} + (L_{24} + X) +}{(L_{25} - X) + L_{22} + L_{23} + L_{26}}}{N1} \times 100\% \quad (7)$$

For comparison, a set of parameters are employed. For example, these parameters include: N1=50, $L_{21}$=57.58 mm, $L_{22}$=85.34 mm, $L_{23}$=64.79 mm, $L_{24}$=15 mm, $L_{25}$=50.37 mm, $L_{26}$=15.45 mm, X=35.37 mm, $L_{32}$=25 mm, and $L_{paper}$=297 mm. After the above parameters are substituted into the formula (4), the formula (7) and the formula (8), the results of the duplex scanning efficiency are obtained. The results demonstrate that the duplex scanning efficiency $\eta_1$ of the present duplex scanning apparatus 2 is 48.40%, the duplex scanning efficiency $\eta_2$ of the conventional duplex scanning apparatus 1 in the first operating approach is 42.19%, and the duplex scanning efficiency $\eta_3$ of the conventional duplex scanning apparatus 1 in the second operating approach is 47.24%. That is, the duplex scanning apparatus of the present invention has better scanning efficiency, so that the waiting time period of operating the duplex scanning apparatus by the user is shortened.

Figure 5:
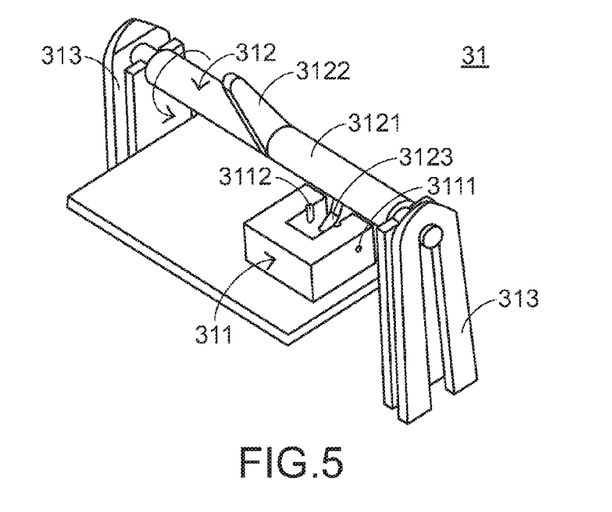
FIG. 5 is a schematic perspective view illustrating the first sheet sensing module of the duplex scanning apparatus of FIG. 2.

FIG. 5 is a schematic perspective view illustrating the first sheet sensing module of the duplex scanning apparatus of FIG. 2. As shown in FIG. 5, the first sheet sensing module 31 comprises a first electronic sensor 311, a first sensing arm 312, and a first supporting member 313. The first sensing arm 312 has a first rotating part 3121, a first contacting part 3122, and a first sheltering part 3123. The first contacting part 3122 and the first sheltering part 3123 are fixed on the first rotating part 3121. In this embodiment, the first electronic sensor 311 is an optical sensor, which has a first emitting part 3111 for emitting a light beam and a first receiving part 3112 for receiving the light beam.

The first rotating part 3121 has a cylindrical shape. In addition, both ends of the first rotating part 3121 are pivotally coupled to two portions of the supporting member 313, respectively. In a case that the first sensing arm 312 is not triggered, the first contacting part 3122 is partially exposed to the inverting channel 24. Meanwhile, the first sheltering part 3123 is arranged between the first emitting part 3111 and the first receiving part 3112 to shelter the light beam. Consequently, the light beam from the first emitting part 3111 fails to be received by the first receiving part 3112. In a case that any document is transferred through the inverting channel 24 to push the first contacting part 3122 of the first sensing arm 312, the first contacting part 3122 is toppled down by the front edge of the advancing document. At the same time, the first sensing arm 312 performs a rotating action with the first rotating part 3121 serving as an axle center, so that the first sheltering part 3123 is correspondingly moved. Under this circumstance, the light beam from the first emitting part 3111 can be received by the first receiving part 3112. According to the operating status of the first electronic sensor 311, the first sheet sensing module 31 issues a first sensing signal.

Figure 6:
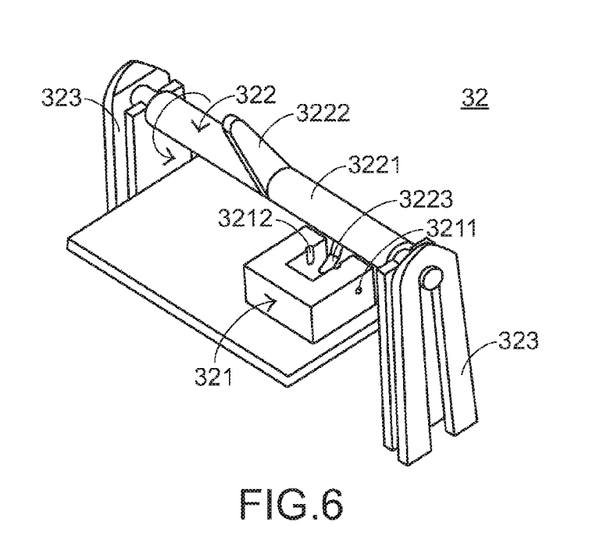
FIG. 6 is a schematic perspective view illustrating the second sheet sensing module of the duplex scanning apparatus of FIG. 2.

FIG. 6 is a schematic perspective view illustrating the second sheet sensing module of the duplex scanning apparatus of FIG. 2. As shown in FIG. 6, the second sheet sensing module 32 comprises a second electronic sensor 321, a second sensing arm 322, and a second supporting member 323. The second sensing arm 322 has a second rotating part 3221, a second contacting part 3222, and a second sheltering part 3223. The second contacting part 3222 and the second sheltering part 3223 are fixed on the second rotating part 3221. In this embodiment, the second electronic sensor 321 is also an optical sensor, which has a second emitting part 3211 for emitting a light beam and a second receiving part 3212 for receiving the light beam.

The second rotating part 3221 has a cylindrical shape. In addition, both ends of the second rotating part 3221 are pivotally coupled to two portions of the second supporting member 323, respectively. In a case that the second sensing arm 322 is not triggered, the second contacting part 3222 is partially exposed to the sheet feeding channel 22. Meanwhile, the second sheltering part 3223 is arranged between the second emitting part 3211 and the second receiving part 3212 to shelter the light beam. Consequently, the light beam from the second emitting part 3211 fails to be received by the second receiving part 3212. In a case that any document is transferred through the sheet feeding channel 22 to push the second contacting part 3222 of the second sensing arm 322, the second contacting part 3222 is toppled down by the front edge of the advancing document. At the same time, the second sensing arm 322 performs a rotating action with the second rotating part 3221 serving as an axle center, so that the second sheltering part 3223 is correspondingly moved. Under this circumstance, the light beam from the second emitting part 3211 can be received by the second receiving part 3212. According to the operating status of the second electronic sensor 321, the second sheet sensing module 32 issues a second sensing signal.

From the above discussions, since the duplex scanning apparatus 2 needs two or more electronic sensors (e.g. two electronic sensors 311 and 321) to achieve the controlling process, the fabricating cost is high. In views of cost-effectiveness, the present invention further provides a duplex scanning apparatus using a sheet sensing module with a single electronic sensor. The use of the single electronic sensor can simultaneously achieve the functions of the first sheet sensing module 31 and the second sheet sensing module 32.

Figure 7:
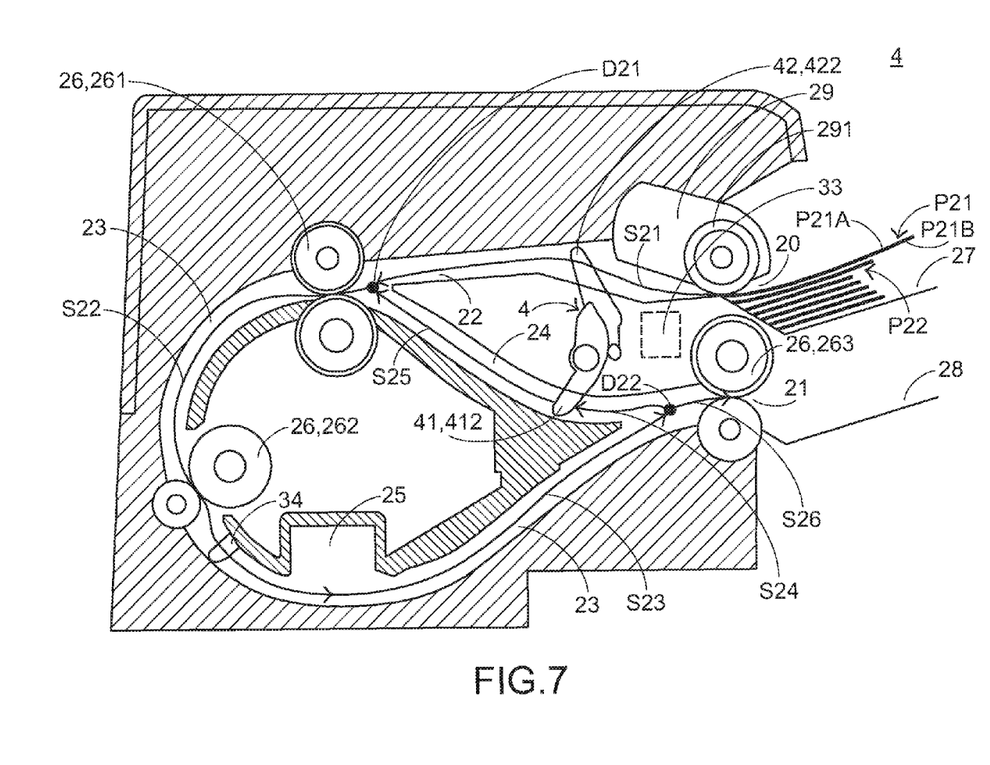
FIG. 7 is a schematic side view illustrating a duplex scanning apparatus according to another embodiment of the present invention.
Figure 8:
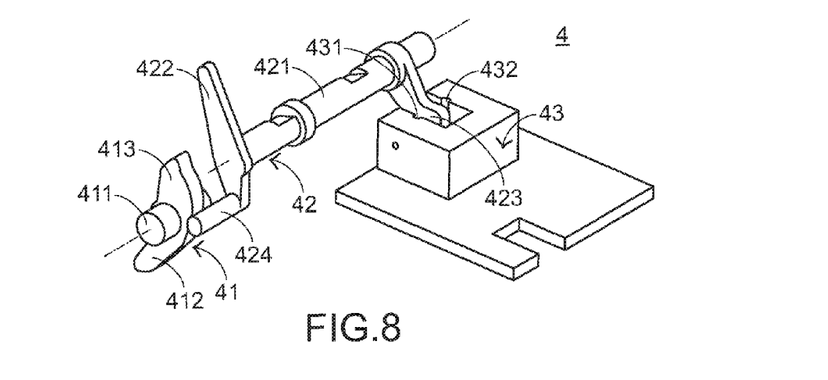
FIG. 8 is a schematic perspective view illustrating a portion of a sheet sensing module of the duplex scanning apparatus of FIG. 7.

Please refer to FIGS. 7 and 8. FIG. 7 is a schematic side view illustrating a duplex scanning apparatus according to another embodiment of the present invention. FIG. 8 is a schematic perspective view illustrating a portion of a sheet sensing module of the duplex scanning apparatus of FIG. 7. As shown in FIG. 7, a first sensing arm and a second sensing arm of the sheet sensing module are not triggered. Except that the sheet sensing module 4 is employed to replace the first sheet sensing module 31 and the second sheet sensing module 32 of the above embodiment, the structures of the duplex scanning apparatus of this embodiment are substantially identical to those of the above embodiment, and are not redundantly described herein.

The sheet sensing module 4 comprises a first sensing arm 41, a second sensing arm 42, and an electronic sensor 43. The first sensing arm 41 is partially exposed to the inverting channel 24. The second sensing arm 42 is partially exposed to the sheet feeding channel 22. In this embodiment, the electronic sensor 43 is an optical sensor, which has an emitting part 431 for emitting a light beam and a receiving part 432 for receiving the light beam.

The second sensing arm 42 has a second rotating part 421, a second contacting part 422, a second linking part 424, and a sheltering part 423. The second contacting part 422, the second linking part 424 and the sheltering part 423 are fixed on the second rotating part 421. The second rotating part 421 has a cylindrical shape. In addition, both ends of the second rotating part 421 are pivotally coupled to two supporting members, respectively. For clearly illustrating the relationships between other components, these two supporting members are not shown. The second contacting part 422 is partially exposed to the sheet feeding channel 22. The sheltering part 423 is arranged between the emitting part 431 and the receiving part 432 to shelter the light beam. Consequently, the light beam from the emitting part 431 fails to be received by the receiving part 432.

The first sensing arm 41 has a first rotating part 411, a first contacting part 412, and a first linking part 413. The first contacting part 412 and the first linking part 413 are fixed on the first rotating part 411. The first rotating part 411 has a cylindrical shape. In addition, both ends of the first rotating part 411 are pivotally coupled to other two supporting members, respectively. For clearly illustrating the relationships between other components, the two supporting members are not shown. The first contacting part 412 is partially exposed to the inverting channel 24. The first linking part 413 is in contact with the second linking part 424. Alternatively, the first linking part 413 and the second linking part 424 may be separated from each other by a gap as long as a linkage relationship between the second linking part 424 and the first linking part 413 can be established.

Figure 9:
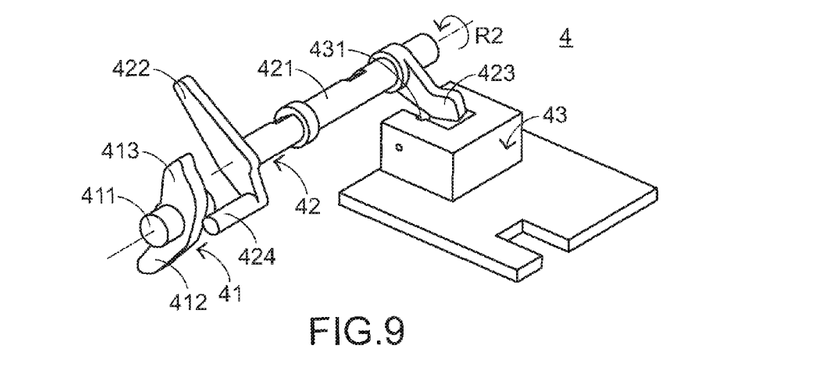
FIG. 9 is a schematic perspective view illustrating the sheet sensing module of FIG. 7, in which the second sensing arm is triggered.

FIG. 9 is a schematic perspective view illustrating the sheet sensing module of FIG. 7, in which the second sensing arm is triggered. In a case that any document is transferred through the sheet feeding channel 22 to push the second contacting part 422 of the second sensing arm 42, the second contacting part 422 is toppled down by the front edge of the advancing document. At the same time, the second sensing arm 42 is rotated in a second direction R2 (i.e. a second rotating action) with the second rotating part 421 serving as an axle center. Consequently, the sheltering part 423 is departed from the region between the emitting part 431 and the receiving part 432. Under this circumstance, the light beam from the emitting part 431 can be received by the receiving part 432. According to the operating status of the electronic sensor 43, the sheet sensing module 4 issues a sensing signal. Moreover, during the above process of triggering the second sensing arm 42, the first sensing arm 41 is immobile.

Figure 10:
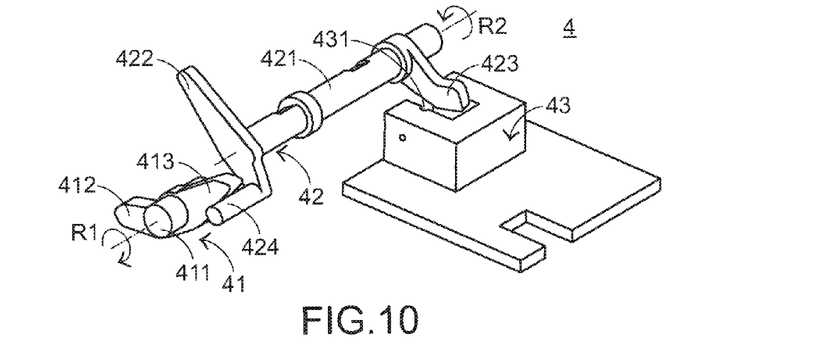
FIG. 10 is a schematic perspective view illustrating the sheet sensing module of FIG. 7, in which the first sensing arm is triggered.

FIG. 10 is a schematic perspective view illustrating the sheet sensing module of FIG. 7, in which the first sensing arm is triggered. In a case that any document is transferred through the inverting channel 24 to push the first contacting part 412 of the first sensing arm 41, the first contacting part 412 is toppled down by the front edge of the advancing document. At the same time, the first sensing arm 41 is rotated in a first direction R1 (i.e. a first rotating action) with the first rotating part 411 serving as an axle center. Consequently, the first linking part 413 is synchronously rotated. During rotation of the first linking part 413, the second linking part 424 is pushed by the first linking part 413, so that the second sensing arm 42 is rotated in the second direction R2 (i.e. the second rotating action) with the second rotating part 421 serving as an axle center. Similarly, the sheltering part 423 is departed from the region between the emitting part 431 and the receiving part 432. Under this circumstance, the light beam from the emitting part 431 can be received by the receiving part 432. According to the operating status of the electronic sensor 43, the sheet sensing module 4 may issue the sensing signal.

Preferably, the duplex scanning apparatus 2 further comprises an enabling sensor 34. The enabling sensor 34 is arranged between the first end D21 of the inverting channel 24 (i.e. the junction D21 between the sheet feeding channel 22 and the sheet transfer channel 23) and the image reading module 25. The enabling sensor 34 is used for detecting whether the document is transferred through the position of the enabling sensor 34. When the document is transferred through the position of the enabling sensor 34, the enabling sensor 34 issues an enabling signal. In response to the enabling signal, the image reading module 25 is enabled. That is, if the enabling signal is not outputted from the enabling sensor 34, the image reading module 25 is in an idle status to achieve a power-saving purpose. The operating principles of the enabling sensor 34 to detect whether the document is transferred through its position may be identical to the optical sensing mechanism of the sheet sensing module, and are not redundantly described herein.

Moreover, the rotating speed of the transfer roller 261 of the transfer roller assembly 26 is faster than the sheet pick-up roller 291 of the sheet pick-up module 29. Consequently, the transmitting speed of any document in the inverting channel 24 is faster than the transmitting speed of any document in the sheet feeding channel 22. In such way, a proper spacing interval between any two successive documents within the duplex scanning apparatus 2 may be effectively maintained.

Furthermore, in this embodiment, the rotating direction R1 of the first rotating action is opposite to the rotating direction R2 of the second rotating action. Consequently, when the document P21 is transferred through the inverting channel 24 to trigger the first sensing arm 412 and thus the next document P22 placed on the sheet input tray 27 is fed into the sheet feeding channel 22, the second contacting part 422 of the second sensing arm 42 will not be synchronously rotated to hinder or influence the movement of the next document P22.

In the above embodiment, the duplex scanning apparatus is presented herein for purpose of illustration and description only. Nevertheless, those skilled in the art will readily observe that numerous modifications and alterations may be made while retaining the teachings of the invention. For example, the sheet sensing module in the above embodiment may be turned upside down. In a case that both of the first sensing arm and the second sensing arm are not triggered, the second contacting part is partially exposed to the inverting channel, and the first contacting part is partially exposed to the sheet feeding channel.

Furthermore, the operating principle of the sheet sensing module of the above embodiment may be re-designed. For example, in a case that both of the first sensing arm and the second sensing arm are not triggered, the region between the emitting part and the receiving part is not sheltered by the sheltering part. That is, the light beam from the emitting part is normally received by the receiving part. In a case that the first sensing arm or the second sensing arm is triggered, the sheltering part is correspondingly moved to the region between the emitting part and the receiving part to shelter the light beam. Under this circumstance, the light beam from the emitting part fails to be received by the receiving part, and thus the electronic sensor generates the sensing signal.

From the above description of the above embodiment, the sheet sensing module of the present invention is capable of sensing the transmitting status of the document in at least two channels by using a single electronic sensor. Consequently, the fabricating cost of the duplex scanning apparatus of the present invention may be effectively reduced.

While the invention has been described in terms of what is presently considered to be the most preferred embodiments, it is understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A duplex scanning apparatus, comprising:
    a sheet entrance and a sheet exit;
    a sheet feeding channel connected to said sheet entrance;
    a sheet pick-up module disposed in said sheet entrance for feeding a document into said sheet feeding channel;
    a sheet transfer channel arranged between said sheet feeding channel and said sheet exit;
    an inverting channel, wherein a first end of said inverting channel is connected to a junction between said sheet feeding channel and said sheet transfer channel, and a second end of said inverting channel is connected to said sheet transfer channel;
    an image reading module disposed in said sheet transfer channel for reading an image of a document;
    a transfer roller assembly for transferring said document which is located within said sheet feeding channel, said sheet transfer channel or said inverting channel;
    a sheet sensing module for sensing a transmitting status of said document in said inverting channel, thereby issuing a sensing signal, wherein said sheet sensing module comprises:
        a first sensing arm at least partially exposed to said inverting channel, wherein when said document is transferred through said inverting channel, said first sensing arm is pushed by said document;
        an electronic sensor for issuing said sensing signal according to a moving status of said first sensing arm, wherein said electronic sensor is an optical sensor, wherein said optical sensor has an emitting part for emitting a light beam and a receiving part for receiving said light beam; and
        a second sensing arm, which is at least partially exposed to said sheet feeding channel, wherein when said document is transferred through said sheet feeding channel, said second sensing arm is pushed by said document, wherein said electronic sensor issues said sensing signal according to a moving status of said second sensing arm; and
    a controller electrically connected to said sheet pick-up module and said sheet sensing module, wherein in response to said sensing signal, said controller drives said sheet pick-up module to feed a next document into said sheet feeding channel,
    wherein a distance between said sheet sensing module and said first end of said inverting channel is greater than a distance between said sheet sensing module and said second end of said inverting channel.

2. The duplex scanning apparatus according to claim 1, wherein said first sensing arm comprises a first rotating part, a first contacting part fixed on said first rotating part, and a sheltering part fixed on said first rotating part, wherein said first contacting part is at least partially exposed to said inverting channel, wherein when said first contacting part is pushed by said document, said first sensing arm performs a first rotating action with said first rotating part serving as an axle center, so that said sheltering part is synchronously rotated.

3. The duplex scanning apparatus according to claim 2, wherein before said first sensing arm performs said first rotating action, said sheltering part is arranged between said emitting part and said receiving part, so that said light beam from said emitting part fails to be received by said receiving part.

4. The duplex scanning apparatus according to claim 1, wherein said second sensing arm comprises a second rotating part and a second contacting part fixed on said first rotating part, wherein said second contacting part is at least partially exposed to said sheet feeding channel, wherein said first sensing arm comprises a first rotating part and a first contacting part fixed on said first rotating part, and said first contacting part is at least partially exposed to said inverting channel, wherein when said second contacting part is pushed by said document, said second sensing arm performs a second rotating action with said second rotating part serving as an axle center, wherein when said first contacting part is pushed by said document, said first sensing arm performs a first rotating action with said first rotating part serving as an axle center.

5. The duplex scanning apparatus according to claim 4, wherein said second sensing arm further comprises a sheltering part and a second linking part, and said sheltering part and said second linking part are fixed on said second rotating part, so that said sheltering part is synchronously rotated in response to said second rotating action of said second sensing arm, wherein said first sensing arm further comprises a first linking part, and said first linking part is fixed on said first rotating part, so that said first linking part is synchronously rotated in response to said first rotating action of said first sensing arm, wherein in response to said first rotating action of said first sensing arm, said second linking part is pushed by said first linking part, so that said second sensing arm performs said second rotating action.

6. The duplex scanning apparatus according to claim 5, wherein before said second sensing arm performs said second rotating action, said sheltering part is arranged between said emitting part and said receiving part, so that said light beam from said emitting part fails to be received by said receiving part.

7. The duplex scanning apparatus according to claim 4, wherein said first sensing arm further comprises a sheltering part and a first linking part, and said sheltering part and said first linking part are fixed on said first rotating part, so that said sheltering part is synchronously rotated in response to said first rotating action of said first sensing arm, wherein said second sensing arm further comprises a second linking part, and said second linking part is fixed on said second rotating part, so that said second linking part is synchronously rotated in response to said second rotating action of said first sensing arm, wherein in response to said second rotating action of said second sensing arm, said first linking part is pushed by said second linking part, so that said first sensing arm performs said first rotating action.

8. The duplex scanning apparatus according to claim 7, wherein before said first sensing arm performs said first rotating action, said sheltering part is arranged between said emitting part and said receiving part, so that said light beam from said emitting part fails to be received by said receiving part.

9. The duplex scanning apparatus according to claim 4, wherein said first rotating action and said second rotating action have opposite rotating directions.

10. The duplex scanning apparatus according to claim 4, wherein said duplex scanning apparatus is permitted to be operated in a single-sided scanning mode or a duplex image scanning mode, wherein if said duplex scanning apparatus is operated in said single-sided scanning mode, said document is not transferred through said inverting channel.

11. The duplex scanning apparatus according to claim 10, wherein if said duplex scanning apparatus is operated in said single-sided scanning mode, when said document is transferred through said sheet feeding channel to trigger said second sensing arm, said next document is fed into said sheet feeding channel through said sheet entrance.

12. The duplex scanning apparatus according to claim 10, wherein if said duplex scanning apparatus is operated in said duplex image scanning mode, when said document is transferred through said inverting channel to trigger said first sensing arm, said next document is fed into said sheet feeding channel through said sheet entrance.

13. The duplex scanning apparatus according to claim 1, further comprising a sheet input tray, which is located near said sheet pick-up module for placing said document thereon.

14. The duplex scanning apparatus according to claim 1, further comprising a sheet output tray, which is located near said sheet exit, wherein said document ejected from said sheet exit is supported on said sheet output tray.

15. The duplex scanning apparatus according to claim 1, further comprising an enabling sensor, which is arranged between said junction and said image reading module for detecting whether said document is transferred through a position of said enabling sensor, wherein if said enabling sensor detects that said document is transferred through said position of said enabling sensor, said image reading module is enabled.

16. The duplex scanning apparatus according to claim 1, wherein said transfer roller assembly at least comprises one transfer roller, and said sheet pick-up module at least comprises one sheet pick-up roller, wherein a rotating speed of said transfer roller is faster than that of said sheet pick-up roller.

* * * * *